Patented Sept. 11, 1923.

1,467,587

UNITED STATES PATENT OFFICE.

THOMAS J. NEILAN, OF NEWARK, NEW JERSEY, AND GEORGE W. ZOBANAKY, OF ELMHURST, NEW YORK, ASSIGNORS TO COCOA PRODUCTS COMPANY OF AMERICA INCORPORATED, OF LONG ISLAND CITY, NEW YORK, A CORPORATION OF DELAWARE.

COCOA BUTTER AND METHOD OF RECOVERING SAME.

No Drawing. Application filed December 28, 1920. Serial No. 433,661.

*To all whom it may concern:*

Be it known that we, THOMAS J. NEILAN, a citizen of the United States, residing at Newark, in the county of Essex, State of New Jersey, and GEORGE W. ZOBANAKY, a citizen of the United States, residing at Elmhurst, in the county of Queens, State of New York, have invented certain new and useful Improvements in Cocoa Butter and Methods of Recovering Same; and we do hereby declare the following to be a full, clear, and exact description of the invention, such as will enable others skilled in the art to which it appertains to make and use the same.

This invention relates to the recovery of cocoa butter from the cocoa bean, and particularly from the fines, dust and nibs resulting from the treatment of the cocoa bean in the separation of the usual commercial products therefrom. Such treatment includes the roasting of the bean, followed by cracking and fanning to separate the nibs or meaty part of the bean from the shell. The waste portion consists of the shell, dust and fines, with some nibs, and constitutes 25% of the original bean containing more than 25% of cocoa butter. While attempts have been made to separate cocoa butter from the waste material, no commercial method is known whereby this material may be recovered in an edible condition, and the waste material has been utilized as a cattle food or as a fuel.

It is the object of the invention to provide a simple, economical and efficient method for treating the dust and fines from the cocoa bean, and even the bean itself, for the recovery of refined cocoa butter.

A further object of the invention is the provision of a method of refining cocoa butter, and of thus imparting desirable and novel characteristics thereto.

Attempts to separate cocoa butter from the waste material, other than by the use of chemical extractives which make the product inedible, have been unsuccessful heretofore, owing to the difficulty experienced in digesting the material to a liquor from which the fats may be separated. This difficulty has, however, been entirely obviated by mixing a proportion of an oleaginous binder, preferably cocoa butter, with the waste material prior to digestion. Other binders such as cocoanut fat may be employed, but, of course, the product will be contaminated with the binder used. This may not be objectionable if blended fats are desired. A mass is thus provided which may be reduced to a suitable liquor, and the added cocoa butter or added binder may then be recovered, together with additional fats present in the mass to the extent of substantially 25% of the weight of the waste material treated.

The recovered cocoa butter is generally characterized by a strong taste, owing to the presence of a considerable proportion of the flavoring constituent of the bean, which is accentuated if the bean is highly roasted. Further treatment of the cocoa butter, by boiling under vacuum, effectively eliminates the flavor, and a refined cocoa butter is produced, which has peculiarly marked and desirable properties, making it an exceedingly valuable ingredient of chocolate coatings and the like, employed in the confectionery trade. The same desirable properties may also be imparted to ordinary commercial grades of cocoa butter by subjecting this material to a similar refining process.

In carrying out the invention, the cocoa beans are first roasted and then cracked and fanned in accordance with the usual practice to separate the nibs from the waste material. The nibs may be treated for the separation of cocoa butter therefrom in the usual commercial preparation of cocoa, chocolate and chocolate coatings. This portion of the process forms no part of the present invention and is not described, therefore, in detail.

The shells, dust and fines are next subjected to further mechanical separation to remove the shells, leaving a mixture of materials rich in cocoa butter. After such separation, the waste material is roasted, preferably in a cylindrical drum roaster, and is delivered to a dough mixer of any usual or suitable type. Approximately twenty pounds of cocoa butter are added to each one hundred pounds of waste material in the dough mixer, and the mass is thoroughly mixed until the cocoa butter is incorporated therewith.

The batter is removed to a mixing kettle, preferably an elongated revolving receptacle in which it is digested at a temperature of substantially 180° F. until the mass is reduced to a semi-paste. When the digestion has proceeded sufficiently, the semi-paste is ground between revolving steel disks, which are alternately heated and cooled, to ensure that no undigested lumps remain therein. From the disks, the liquor which is smooth and entirely free from agglomerated material, is delivered to a larger mixing kettle, where it is maintained at a temperature of substantially 180° F. until digestion is complete.

The material is now ready for separation of the fats, and is delivered to a hydraulic press, which forces the fats through a filter medium, preferably under a pressure of 5000 to 6000 pounds per square inch, while the material is held at a temperature of approximately 160° F. The residue may be utilized for a variety of purposes, while the separated fats, which include the cocoa butter added, together with cocoa butter amounting to approximately 25% by weight of the waste material treated, is recovered. The recovered fats usually have a poor color and taste and a considerable fibre content, and are subsequently refined.

The refining of the cocoa butter is accomplished by mixing with water and boiling in a vacuum to separate volatile matter, moisture and air. Preferably, the crude cocoa butter is mixed in an open kettle with approximately one quart of water to each 100 pounds of the fats. The amount of water used will vary, depending upon the extent of roasting of the bean. Thus, if lightly roasted, the flavoring principles are not highly developed, and less water may be used. If the bean has been highly roasted, more water must be introduced. The cocoa butter is boiled with the water in the open kettle at a temperature of 212° to 230° F. After the initial boiling, the mass is transferred to a vacuum kettle, a vacuum of 20 inches is pulled on the kettle, and boiling is continued at approximately 230° F. until all moisture and air are removed. During the latter boiling operation, all of the flavoring principles are removed with the water and air; and a clear, substantially tasteless and odorless cocoa butter is produced, which may be run off from the kettle, after the fibrous material has been permitted to settle, and molded in suitable form for commercial handling.

The refined cocoa butter produced in accordance with the method described, differs in certain respects from cocoa butter. It may, for example, be used for the production of chocolate coatings of an unusually brittle character, which will not soften and become greasy in hot weather. Such coatings exhibit a granular fracture and are thus distinguished from the usual coatings, since they require no special hardening ingredients. The improved cocoa butter has a consistency, moreover, which permits the successful manufacture of coatings with a smaller proportion of the butter to the chocolate and sugar employed in coating compositions. The reasons for the superiority of the cocoa butter recovered in accordance with the method herein described are somewhat obscure. It appears, however, that in the product, the fat globules are small and closely compacted with a minimum of air and moisture through the mass.

If derived from waste material by the method described, the cocoa butter is less expensive than that recovered directly from the nibs of the cocoa bean. Cocoa butter from the nibs may, however, be refined in accordance with the method to impart the desired characteristics thereto.

Large quantities of the cocoa beans produced never reach the market, since those of inferior quality are utilized as fertilizer in the countries where they are grown. Cocoa beans, and particularly such as are unsuitable for market, may be treated directly by roasting and digestion, in accordance with the method, and subsequent refining of the crude cocoa butter to produce a high grade material such as is described herein. If the process is conducted at strategic points near the producing areas, the waste material may be returned to the soil as fertilizer, and is quite as valuable for this purpose as the whole bean, now largely wasted in this manner. The method of recovering cocoa butter may be applied to the separation of this material from cocoa beans of any grade, with the result that the recovery is increased and the cost is reduced.

Obviously the method as herein described, presents many economic advantages, being particularly adapted for the recovery of a valuable product from materials which are otherwise of limited value. Either at centers where the cocoa bean is commercially treated for the recovery of cocoa and chocolate, or, in the producing regions, the invention may be advantageously applied to the recovery and refining of cocoa butter in an efficient and economical manner.

Various changes may be made in the details of the method as herein described, the details set forth being principally illustrative and adaptable to modification by those skilled in the art, who will readily appreciate the advantages and possibilities of the invention.

We claim:

1. A method of treating material for the recovery of cocoa butter contained therein, which comprises mixing the material with a limited proportion of an oleaginous binder sufficient only to form a batter, digesting the mass and thereafter separating the cocoa butter from the digested material.

2. A method of treating material for the recovery of cocoa butter contained therein, which comprises mixing the material with a proportion of an oleaginous binder sufficient only to form a batter, digesting the mass, and separating the cocoa butter from the digested material by the application of pressure thereto.

3. A method of treating material for the recovery of cocoa butter contained therein, which comprises thoroughly mixing a limited proportion of cocoa butter sufficient only to form a batter with such material, digesting the mass to form a liquor, and extracting the cocoa butter from the liquor.

4. A method of treating material for the recovery of cocoa butter contained therein, which comprises mixing substantially 20% by weight of cocoa butter with the material, digesting the mass to a liquor, and separating the cocoa butter from the liquor.

5. A method of treating material for the recovery of cocoa butter contained therein, which comprises thoroughly mixing a limited proportion of cocoa butter sufficient only to form a batter with the material, digesting the mass at a temperature of substantially 180° F. to form a liquor, and separating the cocoa butter from the liquor.

6. A method of treating material for the recovery of cocoa butter contained therein, which comprises mixing a limited proportion of cocoa butter sufficient only to form a batter with the material, digesting the mass, grinding the digested mass, completing digestion of the mass, and separating the cocoa butter from the liquid product.

7. A method of treating fines and dust, constituting waste material from the cocoa bean to recover cocoa butter therefrom, which comprises mixing a limited proportion of cocoa butter sufficient only to form a batter with the material, digesting the batter until a liquor is produced, and separating the cocoa butter from the liquor.

8. A method of treating fines and dust, constituting waste material from the cocoa bean, to recover cocoa butter therefrom, which comprises roasting the material, digesting the material with a limited quantity of admixed cocoa butter sufficient only to form a batter, and separating the cocoa butter from the liquor formed.

In testimony whereof we affix our signatures.

THOMAS J. NEILAN.
GEORGE W. ZOBANAKY.